UNITED STATES PATENT OFFICE 2,569,030

PREPARING ALUMINUM WELDING WIRE

Russel V. Vanden Berg, New Kensington, Pa., assignor to Aluminum Company of America, Pittsburgh, Pa., a corporation of Pennsylvania No Drawing. Application April 19, 1950, Serial No. 156,943

4 Claims. (Cl. 134—3)

This invention relates to a method of preparing aluminum wire for use as electrode material in the inert-gas-shielded type of arc welding process for welding aluminum. The method comprises the treatment of aluminum wire, by essentially a two-step procedure employing chemical coating and stripping solutions, to clean and otherwise condition the surface of the wire for use in the aforesaid type of welding process.

The term "aluminum" is used herein to mean pure aluminum, commercial aluminum containing the usual impurities, and aluminum base alloys, except as the context more particularly indicates.

Inert-gas-shielded arc welding processes have long been known. In one such process the arc is struck between the filler wire and the work, without requiring the use of an auxiliary electrode. Various modifications of that process are being employed for aluminum welding, aluminum wire being fed through the welding apparatus so as to provide filler metal for the weld and also serving as a continuous electrode. An arc is struck between the aluminum wire electrode and the work, and the surrounding space is filled with an inert gas such as argon. A number of problems which arise in the employment of a process of the type described are overcome by preparing the aluminum wire in accordance with my invention. These problems and the manner of overcoming them will now be described, it being understood that a general object of the invention is to prepare aluminum wire for successful use as electrode-filler material in a process of the type described.

One of the problems in the use of an aluminum wire as an electrode for arc welding is that of satisfactorily feeding the wire through the welding apparatus (by means of driven rolls, for example.) The wire must pass freely through narrow passages or tubes, but in contact with at least a portion of such passages or tubes for conduction of the welding current into the wire. Therefore, the surface of the aluminum wire should be free from surface protuberances and irregularities in order to facilitate its movement through the welding apparatus.

A related problem in the use of an aluminum wire as an electrode for arc welding is that of making a satisfactory electrical contact with the wire within the welding apparatus. The wire should not have a film on its surface of highly insulating character, since it must pick up the current by frictional contact with parts of the welding apparatus. Therefore, the surface of the aluminum wire should be clean and as free as possible of any electrically insulating film.

Another problem in the use of an aluminum wire as an electrode for arc welding is that of making a sound weld which is as free as possible from porosity. It has been found that, with aluminum wire which has been merely solvent cleaned, the welds made by the process described are often porous and unsound. Further it has been found that weld porosity increases with the application of lubricant or metallic coatings to the wire, which might otherwise be employed to facilitate wire feeding. Therefore, the surface of the aluminum wire should have the characteristics previously indicated, and also be free of lubricant and metallic coatings, for the additional purpose of reducing porosity of the welds made with the wire.

I have found that aluminum wire may be readily cleaned and otherwise suitably conditioned for use as a welding electrode by the two-step procedure comprising (a) zinc coating the wire (even in coiled form) in an alkaline zincate bath or solution and (b) removing the zinc coating in an acid stripping solution. A matte surface especially suited for frictional and electrical contact with other surfaces may be produced. Further I have found that wire so treated may be used as a continuous electrode in the inert-gas-shielded type of arc welding process to produce welds somewhat more free of porosity than is the case with wire not so treated. Tests indicate that the results obtained by treating the aluminum wire in accordance with the invention are far superior to those otherwise obtained, especially where lubricant or metallic coatings are employed.

The preferred method of preparing the aluminum wire involves performance of the following preliminary and treatment steps:

1. Solvent clean.
2. Alkaline clean (and water rinse).
3. Zincate dip (and water rinse).
4. Acid dip (and water rinse).

Although the aluminum wire may be given the zincate dip and the acid dip without any previous treatment, it is advisable to clean the wire thoroughly, as by steps 1 and 2 shown above. Similarly, the water rinses associated with step 2, and also with steps 3 and 4, are recommended but are not fundamentally essential to the "two-step" process of the invention. During the zincate dipping step above described, a thin zinc coating is formed on the surface of the aluminum wires; during the acid dipping step the zinc coating is stripped off and a clean, matte surface left on the wire.

The zincate dipping step comprises immersing the aluminum wire, for about ¼ to 3 minutes, in an aqueous solution of alkali metal zincate. The zincate solution may be made up with about 100 grams of zinc oxide (ZnO) and about 400 grams of caustic soda (NaOH) per liter of bath, the balance being substantially all water, and it is ordinarily used at or near room temperature. A one minute immersion is recommended. Of course, the zincate bath may vary widely in the proportions and concentrations of its components. The amount of zinc oxide may be much lower, or somewhat higher, than 100 grams per liter of bath (e. g. 50 to 125 grams per liter), and the ratio of caustic soda to zinc oxide may range between about 3:1 to 8:1. Further, the bath may be made up with equivalent amounts of other zinc salts and other caustic alkali.

The acid dipping step comprises immersing the aluminum wire (with its zinc coating from the previous step) for sufficient time to remove the zinc coating, usually about ¼ to 1 minute, in an acid solution. The acid solution is best made up with equal volumes of concentrated nitric acid (60 or 70 per cent) and water, and it is ordinarily used at or near room temperature. A 30 second immersion is recommended. Of course, the acid solution may vary widely in composition and concentration so long as it is of adequate strength to remove the zinc coating in a reasonable length of time. I prefer to use a nitric acid solution since it will quickly remove the zinc coating without attacking the underlying aluminum. However, sulfuric acid, and other acids which do not appreciably attack aluminum in the time required, may also be used.

With the treatment recommended I have been able to satisfactorily clean and otherwise condition the surfaces of various types of aluminum wire for use as continuous electrodes.

I claim:

1. The method of preparing aluminum wire for use as electrode in an inert-gas-shielded arc welding process, which method comprises coating said wire by immersion in an aqueous solution of alkali metal zincate and thereafter removing the coating formed in said zincate solution by immersion in an acid stripping solution.

2. The method of preparing aluminum wire for use as electrode in an inert-gas-shielded arc welding process, which method comprises immersing said wire in an aqueous solution of alkali metal zincate whereby a zinc coating is formed on said wire and thereafter immersing said wire in a aqueous solution of nitric acid whereby said coating is removed.

3. The method of claim 1 wherein the wire is immersed in the zincate solution for about ¼ to 3 minutes and is immersed in the stripping solution for about ¼ to 1 minute.

4. The method of claim 1 wherein the zincate solution is made up with about 100 grams of zinc oxide and about 400 grams of caustic soda per liter and the stripping solution is made up with about equal volumes of concentrated nitric acid and water.

RUSSEL V. VANDEN BERG.

No references cited.